(12) United States Patent
Murphy et al.

(10) Patent No.: US 6,212,179 B1
(45) Date of Patent: Apr. 3, 2001

(54) SINGLE-TYPE FABRIC CARD NETWORKS AND METHOD OF IMPLEMENTING SAME (75) Inventors: Steven Allen Murphy; Donald Bruce Bennett, both of Apple Valley; Brian Ralph Larson, Eagan, all of MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/032,534

(22) Filed: Feb. 27, 1998

(51) Int. Cl.[7] .................................................. H04L 12/50
(52) U.S. Cl. ........................ 370/370; 370/369; 370/372
(58) Field of Search .................................. 370/254, 255, 370/256, 257, 370, 372, 367, 369, 386, 387, 408, 361, 400; 340/826, 827, 825.79, 825.86

(56) References Cited

U.S. PATENT DOCUMENTS

| | | | |
|---|---|---|---|
| 4,651,318 | * 3/1987 | Luderer | 370/422 |
| 5,237,565 | * 8/1993 | Henrion et al. | 370/236 |
| 5,337,308 | * 8/1994 | Fan | 370/388 |
| 5,631,902 | * 5/1997 | Yoshifuji | 370/388 |
| 5,666,360 | * 9/1997 | Chen et al. | 370/390 |

* cited by examiner

Primary Examiner—Wellington Chin
Assistant Examiner—Brenda H Pham
(74) Attorney, Agent, or Firm—Glenn W. Bowen; Patrick M. Hogan (57) ABSTRACT An expandable network constructed from a plurality of identical network fabric cards which uses a plurality of selected row address bits to route connection paths between adjacent columns of interconnecting switches and a software algorithm for implementing a network of any whole number power of 2 rows or ports by assigning numbers of the network switches and attached nodes are described.

10 Claims, 6 Drawing Sheets

Figure 6

SINGLE-TYPE FABRIC CARD NETWORKS AND METHOD OF IMPLEMENTING SAME

FIELD OF THE INVENTION

The invention is related to multi-stage interconnection switching networks for the exchange of data between electronic devices, including processors in concurrent computer systems which allow networks of varying node sizes to be built while using standard card types.

BACKGROUND OF THE INVENTION

Prior switching networks of the type which employ a selected plurality of row address bits to determine the routing of connection paths between adjacent columns of interconnecting switches have been implemented in accordance with precise algorithms such that each network node size requires a unique wiring topology and various different kinds of switching cards. The networks of this invention provide for communication paths between a structure of identical switches in a network of this type in accordance with a routing algorithm, which assigns address routing bits so that predefined network cards may be used to expand the network from a small number of network nodes to a larger number of nodes.

Prior networks of this kind were constructed with switches having point-to-point connections between them. The network established connections from requestor devices to responder devices by relaying "requests" and "responses" through the switches. Each switch had built-in control logic to route both requests and responses. The switch setting was determined by using the comparison of the request with the request's current location in the network. Each switch routed the requests using only the information contained in the requests and the local switch to provide distributed routing without a centralized controller. The switch setting was remembered to route the responses on the same paths as the associated request but in the reverse direction.

These networks were constructed so that a switch could route a signal to another switch that has the same switch number except for a single binary digit in the next stage. A request contains a binary number identifying the desired response port. The switch compared the request with the switch number. If the binary digit compared was the same, the request was routed on a binary straight path; otherwise the request was routed to another switch that matched the digit in the request. At the end of the network, the request should have reached the switching output stage whose switch number exactly matched the request. The present invention employs similar switching techniques, but response messages are not necessarily required.

SUMMARY OF THE INVENTION

This invention provides for communication paths between a structure of identical switches for networks of the type in which a selected plurality of row address bits are employed to determine the routing of connection paths between adjacent columns of interconnection switches. The network is implemented by utilizing a software algorithm so that predefined network cards may be used to expand the network from a small number of network nodes to a larger number of nodes by controlling the assignment of switch numbers to the nodes of the network and connections between the network cards. The wiring on all fabric cards is always the same. Wiring between fabric cards changes depending on the size of the network.

BRIEF DESCRIPTION OF THE DRAWINGS

Various features and advantages of the invention will be understood by reference to the following detailed description of the invention and the accompanying drawings in which.

DESCRIPTION OF THE PREFERRED EMBODIMENTS OF THE INVENTION

The initial network size of this invention may include any number of switches ranging from an 8-node switch to any number of nodes, providing that the number of nodes is increased by a factor of 2. For example, an initial 8-node switch could be expanded to 16, 32, 64, etc., using multiple switch cards from the basic 8-node switch network. Obviously, networks having a number of nodes between 16 and 32, such as 24, and between 32 and 64, such as 56, etc., may also be implemented by merely deactivating routing to non-existent nodes.

The recursive networks of the present invention are constructed with switches, which have point-to-point connections between them. The network establishes connections from output terminals of each switch stage to input terminals of the next stage switches. These recursive networks are constructed so that a switch can route a signal called a packet from an output terminal in one stage to an input terminal of a switch in the next stage that has the same number except for a single binary digit from among the binary digits handled between particular stages of switches. The invention is also directly applicable to non-base 2 switches where multiple digits are routed in accordance with known routing techniques. An input request packet contains a binary number that identifies a desired destination node. This binary number is the packet's address. The packet's address is compared by a switch it occupies with the switch's number. At the end of the network, the request packet will reach the output terminal of a switch whose number is the same as the request packet's address, precluding interference with simultaneous routing of other packets.

Figure 1:
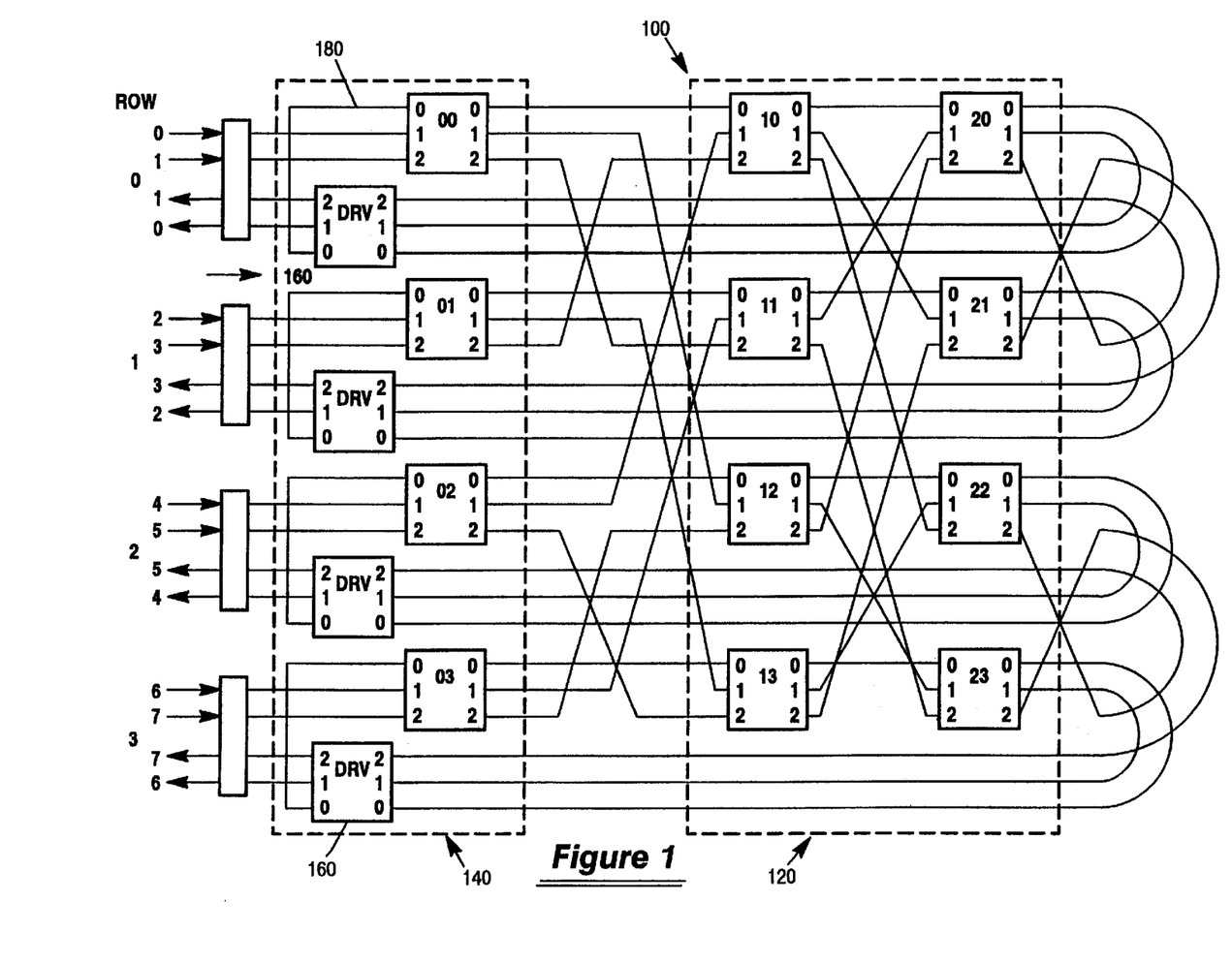
FIG. 1 is a block diagram of a representative 4-row, 8-node switch network which establishes the basic network wiring pattern for the fabric cards of the present invention.
Figure 2:
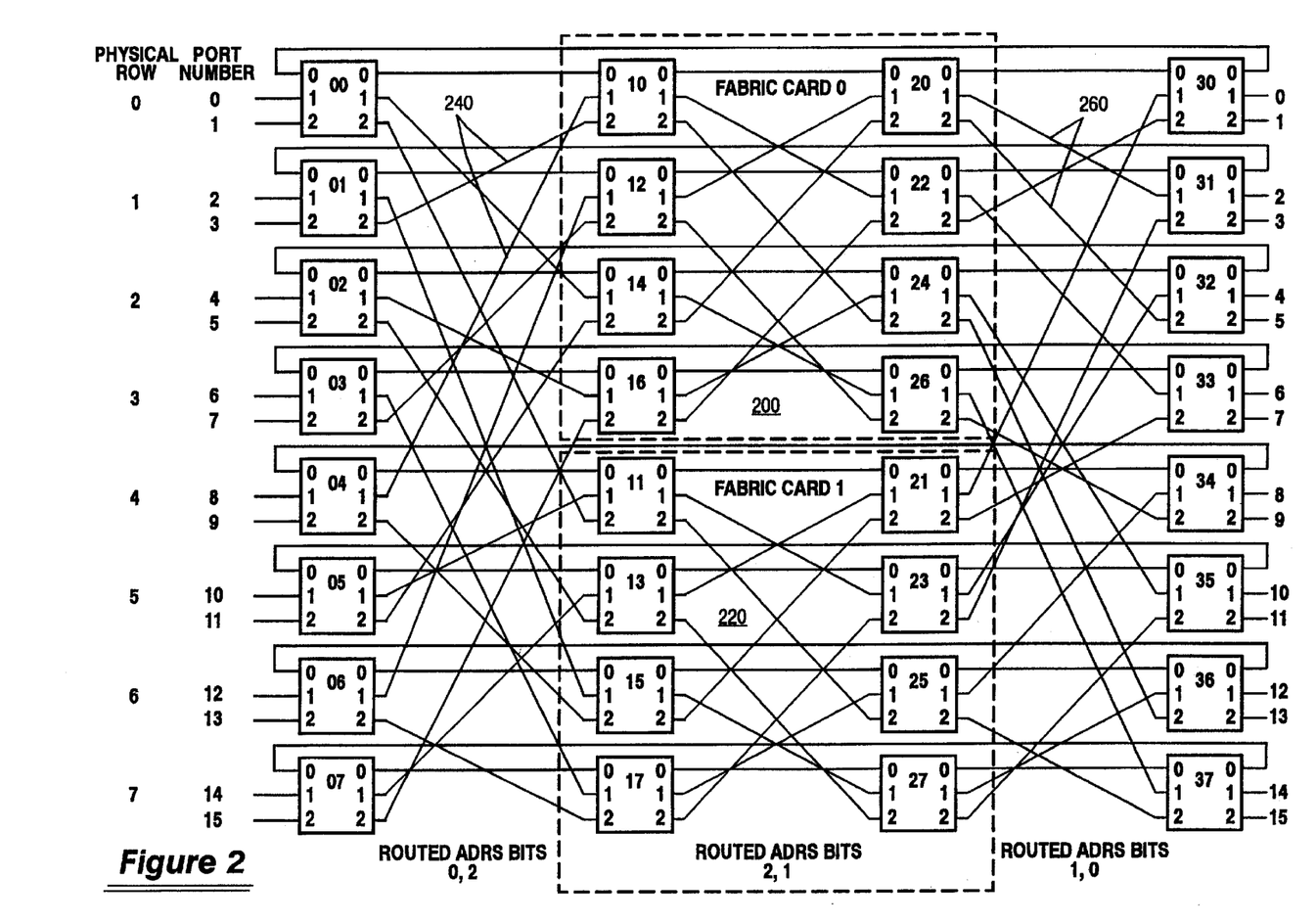
FIG. 2 is a block diagram of a representative 8-row, 16-node switch network which is implemented in accordance with the present invention in which the rows of the network are not permuted.
Figure 3:
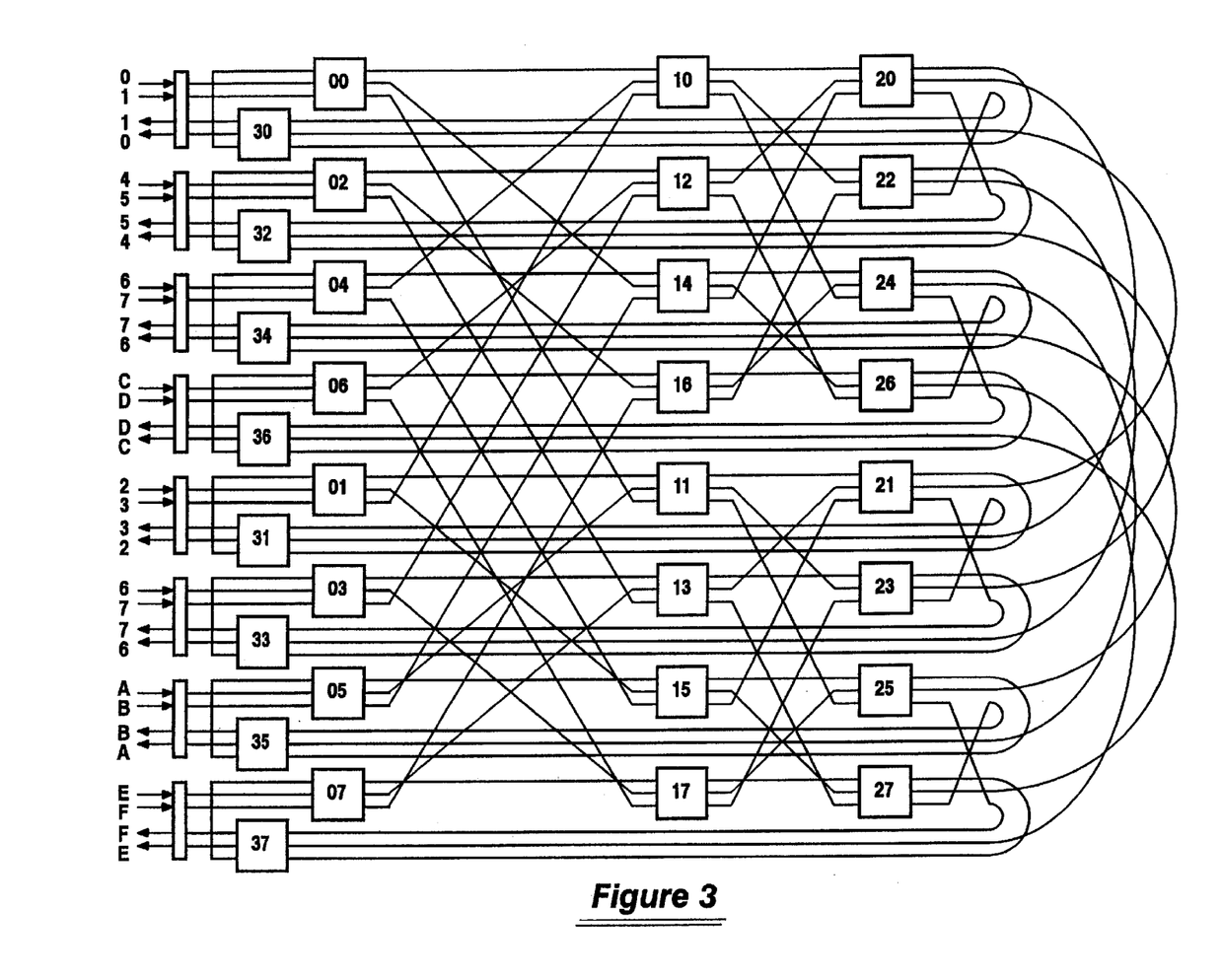
FIG. 3 is a block diagram of a version of the 8-row, 16-node switch network of FIG. 2 in which the rows have been permuted.

The present invention has a general applicability to networks of the type in which one or more selected address bits are routed from the output terminals of one stage of switches to the input terminals of the next succeeding stage of switches. The address bit(s) selected for routing determine the topology of the switch network. FIGS. 1, 2 and 3 illustrate specific embodiments of the present invention from a multitude of embodiments that may be provided using the general method of the invention.

FIG. 1 shows an 8-node switch network 100. In this embodiment the card 120 is called a "fabric card" since it forms a basic card type, which may be utilized to expand the basic network in a recursive factor-of-2 manner, as will be described. Fabric card 120 contains 8 switches which are numbered consecutively 10, 11, 12, 13 in stage 1 and 20, 21,

22, 23 in stage 2 in a manner that tracks the numbering of the rows 0, 1, 2, 3 of the network. A second type of card employed in the network of FIG. 1 is the card 140, which is called an "edge card." Edge card 140 in the embodiment of FIG. 1 contains the input stage of switches 00, 01, 02 and 03. It also contains one driver device, (labeled "DRIVER"), for each row, which provides output signals. The drivers are used in this embodiment to provide a balanced output drive to maintain signal quality and optionally to always have two switches per row on an edge card. All of the switches in the illustrated embodiment have three input terminals and three output terminals, which are numbered 0, 1 and 2. Other embodiments could have more or fewer terminals.

The method of determining the number of columns of switches in addition to those appearing on the fabric cards in any embodiment is defined by the equation:

Additional Number of Columns=1+$\log_2$(Number of Rows)−Number of columns of switches on fabric cards Thus, in the embodiment of FIG. 1, one additional column is specified and in the embodiments of FIG. 2 and FIG. 3 two additional columns are specified.

An alternate embodiment may be provided by utilization of a column of output switches instead of the input column of switches of FIG. 1. In this case, a column of drivers for each row may be utilized in the input column in place of the input column of the switches of FIG. 1.

Another alternate embodiment in FIG. 1 is to swap the positions of the drivers 160 and the last column of switches 20, 21, 22 and 23.

It is noted that it is convenient in many embodiments to employ a separate edge card that is associated with only one row of switches of the fabric cards, as shown in FIG. 1, where four edge cards are utilized. The number of edge cards, however, in an embodiment may vary in any manner desired. For example, a single edge card could be employed for each fabric card for half, or some other fraction, of the rows of a fabric card or for two or more fabric cards.

In the embodiment of FIG. 1, the output terminals of the output stage switches 20, 21, 22 and 23 are coupled directly to corresponding input terminals of the driver device in the same row. A loop or recirculation path from the output terminal of the last stage of switches may be provided through each output driver 160 to the input terminal 0 of the stage 0 input switch of the same row, as illustrated by the recirculation path 180, from the output of the driver in row 0 to the input terminal 0 of switch 00.

Use of one or more recirculation paths is an optional feature of a network constructed in accordance with the invention that may be removed, if desired. As one illustration of such modification, the embodiment of FIG. 1 could be simply converted to a three-external input and three-external output embodiment by coupling an external input to the input terminals of each of the input columns of FIG. 1 that are shown as being supplied by a driver and by coupling each of such outputs of the drivers to an external output. Alternately, the recirculation path and the associated inputs and outputs could be removed or disabled.

The row address is used for determining the wiring topology of the network. The wiring pattern established on the fabric cards of FIG. 1 is maintained when fabric cards are used to build larger networks renumbering the switches on the fabric cards that are used in larger networks as described herein. In the network of FIG. 1 the row wiring address bits which are used for wiring between stage 0 and stage 1 are bits 1 and 0. The row wiring address bits are used to make routing decisions. In addition to the address bits used to identify which row a switch or packet occupies, another address bit determines the proper output port on the destination row. The row wiring address bits are numbered independently of that additional address bit. In FIG. 1 row wiring address bit 0 actually refers to destination port address bit 1 since for this network there are two ports per switch row. Other networks can have just one port per switch row and so then there would not be an additional address bit.

In the embodiment of FIG. 1 when a request enters a switch it has three choices for output terminal. The request can go straight across to the next stage of switches via terminal 0. It can take a diagonal path out of terminal 1 or a different diagonal path out of terminal 2. In FIG. 1 bit 1 is the row wiring address bit for output terminal 1. Since $2^1$=2, this means that output terminal 1 of switch 00 will be routed to input terminal 1 of a switch whose number is two higher than the requesting switch 00. In other words, output terminal 1 of the row 0, stage 0 (switch 00) will be connected to input terminal 1 of row 2, stage 2 (switch 12).

If the request doesn't want to go to switch 12 or switch 12 is busy and cannot receive the request on its terminal 1, then the request may be sent out on output terminal 2 of switch 00. In this event, the row routing bit 0 assigned to terminal 2 results in $2^0$=1 so that output terminal 2 of switch 00 will be connected to input terminal 2 of the row 1 switch 11. In the described embodiment of FIG. 1, connections are made between the output terminals of the switches in stage 1 and the input terminals of stage 2 by reversal of the routing address bits that are used for the stage 0 to stage 1 connections. Thus, output terminal 1 of switch 10 is connected to input terminal 1 of switch 21, and output terminal 2 of switch 10 is coupled to input terminal 2 of switch 22. Wiring between the edge card 140 and the fabric card 120 is preferably by external or back-panel wiring.

The 16-node switch embodiment of FIG. 2 has first stage switches, which are designated 00–07. The first digit 0 indicates that this is in the first stage or column of the network. The second digit indicates the row number of each switch. Therefore, switch 00 is in the input column and in row zero, and switch 07 is in the first stage and row 7. Last stage switches are located in the right-most column, or third stage. Therefore, all of the two-digit numbers representing the switches in this stage begin with a number 3. The switch 30 is thus in stage 3 and row 0, while the switch 37 is in the output stage 3 and row 7.

In the network of FIG. 2 all of the 0 output terminals from the last stage switches 30–37 are connected back through their respective recirculating loop to the 0 input terminals of a switch in the first stage in the same row as the output switch. For example, output terminal 0 of switch 30 is connected back to input terminal 0 of switch 00. This is an optional recirculation path that may be implemented in a switch constructed in accordance with the invention. It is also noted that switch 00 has a 0 output terminal connected to the 0 input port of the succeeding stage switch 10. The switch 10, in a similar manner, has its output port 0 connected to the input port 0 of the next stage switch 20 in the same row, and the output terminal 0 of the switch 20 is connected to the input terminal 0 of the switch 30.

Each of the input terminals of stage 0 switches and each of the output terminals of stage 3 switches may be sequentially numbered as ports, as shown in FIG. 2. In this manner a request at any input given port, such as port 4, is destined to an output port, such as port 7, to which the desired data is to be transmitted. Output terminals 1 and 2 of each of the switch stages represent diagonal paths which may be used to transmit data from one switch stage to the next succeeding switch stage but in a different row.

The first stage switches 00–07 and the last stage switches 30–37 may be provided on a plurality of separate edge cards or they may all be provided on a single edge card. In the illustrated embodiment of FIG. 2, they are shown as being located on opposite ends of the network, but they could be located on the same edge card and appear on the same side of the drawing as in FIG. 1. In the illustrated embodiment there are two fabric cards 200, 220. Fabric card 200 contains the switches 10, 12, 14 and 16 in stage 1 and switches 20, 22, 24 and 26 in stage 2. A second fabric card 220 contains switches 11, 13, 15 and 17 in stage 1 and the switches 21, 23, 25 and 27 in stage 2. Each of the fabric cards 200 and 220 in FIG. 2 contains 8 switches and they are identical to each other and to fabric card 120 of FIG. 1. Other embodiments can have a different number of switches per fabric card. When large networks of the illustrated type are constructed, the same type of card may be utilized to implement larger networks.

Wiring between the switches in first and last stages and those on the fabric cards is provided by a multi-layer printed wiring board. For example, in FIG. 2 wiring between the output terminal 1 of switch 00 and the input terminal 1 of switch 14, and between output terminal 2 of switch 00 and the input terminal 2 of switch 11, is provided by a printed wiring board, such as 240, 260. The wiring of connections between the switches of input stage 0 and those of stage 1 of the fabric cards are determined by the row wiring address bits 0 and 2. Bit 0 is associated with terminal 2 and bit 2 with terminal 1. Thus, the output terminal 1 of switch 00 in column 0 is connected according to the row wiring address bit 2. Output terminal 1 of the switch 00 is connected to the input terminal 1 of the switch 14 in the embodiment of FIG. 2 since $2^2=4$. In FIG. 3 it is also seen that the output terminal 1 of the switch 04 is connected to the input terminal 1 of the switch 10. In a similar manner, the terminals 2 of the switches in stage 0 are routed in accordance with the toggled status of the row wiring address bit 0, $(2^0=1)$. The switch 00 in FIG. 2 has its output terminal 2 connected to the input terminal 2 of the switch 11, and the output terminal 2 of the switch 07 is connected to the input terminal 2 of the switch 16.

The wiring between the switches in stage 2 and those in output stage 3 are again provided by printed wiring board 260. The row wiring address bits used to connect output terminals 1 and 2 of the switches in stage 2 to the input terminals 1 and 2 of the switches in stage 3 in the embodiment of FIG. 2 are row address bits 0 and 1, respectively. In this instance, the output terminals 1 are connected according to the row routing address bit 0 referring to FIG. 2. The output terminal 1 of the switch 20 is connected to the input terminal 1 of the switch 31, and the output terminal 1 of the switch 21 is connected to the input terminal 1 of the switch 30. The output terminals 2 of the switches in stage 2 are connected according to the row routing address bit 1. Referring to FIG. 2, the output terminal 2 of the switch 22 is connected to the input terminal 2 of the switch 30, and the output terminal 2 of switch 24 is connected to the input terminal 2 of the switch 36. Connections between the switches in stage 2, which appear on the fabric cards, and the input terminals of the switches in stage 3 of the output column of switches, which appear on the edge card or cards, is accomplished by back-panel or external wiring.

Two fabric cards 200 and 220 have their switches numbered in a pattern which does not follow the sequential pattern of the input and output columns, as did the switches on the fabric card of FIG. 1. The wiring between the output terminals of the switches in stage 1 and the input terminals of the switches in stage 2 is wiring which is provided on the fabric cards themselves, and not by back-panel wiring.

For a 32-port network, eight fabric cards will be required. The 32-port network will have five switch stages plus a driver stage and 16 rows of switches.

The switch numbers of the switches in the network of FIG. 1 and the switch numbers of the network of FIG. 2 are different. The numbers in each of the networks complies with the switch numbers necessary to correctly route the input and output terminals using the selected row routing address bits for routing. By changing the switch numbers and keeping the wiring pattern constant for each of the cards, larger networks can be constructed by following the same routing address pattern. Although this causes a variation in the back-panel wiring, it does not require different fabric cards to be constructed for larger networks.

FIG. 3 illustrates a revised version of the embodiment shown in FIG. 2 in which the output column switches 30–37 are shown on the same side of the network as the input column switches 00–07 and may be placed on the same edge card. In addition, the numbering of edge cards and their locations may be permuted in any manner. This permits the rows of the input column switches to be rearranged so that they are no longer in sequential order, as illustrated in FIG. 3. In this embodiment the switches in input stage 0 are now ordered into rows as follows: 0, 2, 4, 6, 1, 3, 5 and 7. The reason for rearranging the rows is to simplify the back-panel wiring pattern. It is noted that the back-panel wiring in the embodiment of FIG. 3 follows a simpler, more symmetrically ordered pattern than the wiring shown in FIG. 2, but the original row numbers still define the switch numbers in accordance with the method. The port numbers in FIG. 3 are numbered 0-F in hexadecimal notation.

Table 1 shows the row wiring address bits that may be applied to the 16-row, 32-port network embodiment. The row wiring address bits 0, 3 in the table are shown as indicating the wiring of output terminal 2 by row wiring address bit 0 and output terminal 1 by row routing address bit 3. Table 2 shows one example of the row wiring address bits of a 32-row, 64-port network embodiment. Other embodiments can be made by choosing different row wiring address bits.

TABLE 1

| Stage | 0    | 1    | 2    | 3    |
|-------|------|------|------|------|
| Bits  | 0, 3 | 3, 2 | 2, 1 | 1, 0 |

TABLE 2

| Stage | 0    | 1    | 2    | 3    | 4    |
|-------|------|------|------|------|------|
| bits  | 0, 4 | 4, 3 | 3, 2 | 2, 1 | 1, 0 |

The method for assigning switch numbers to fabric cards to be used in a network follows the steps below:

Pick the network size num_rows where 4 is the minimum number of rows and num_rows is a whole power of 2. For example, 8, 16, 256 or 2048 rows. Other sizes can be made by partial population.

Pick how many columns (stages) there are per fabric card where 2 is the minimum number of columns. For example, choose 2 columns per card.

Determine how many row address bits are wired within each fabric card (bits_routed_per_fabric_card). If two columns are placed on each fabric card, then there is one stage of wires between them so bits routed per-fabric-card=2. If 3 columns are placed on a fabric card, then the 2 stages of wires between them handle 3 bits because one bit must be routed in each stage. Repeated row wiring address bits are a feature of layered networks. Other topologies are different but determining bits routed per fabric card will be similar. For layered networks bits routed per_fabric_card= number of columns per fabric card.

Determine rows_per_card=$2^{bits\_routed\_per\_fabric\_card}$.
Rows_per_card only gives the minimum number of rows per card. The actual number can be any integer multiple of the minimum. num_cards_per_column= num_rows/rows_per_card.

Pick which row address bits will be routed for each column of cards for the desired wiring topology. For example, a column may be routing row address bits 2 and 1. (See example below.)

Sort the row routing address bits from high to low and reverse sequentially number them from high to low using routed_bit_index as follows:

| row address bits: | highest routed address bit . . . lowest |
|---|---|
| routed_bit_index: | num_routed_adrs_bits − 1 . . . 0 |
| For example: | |
| row address bits: | 2   1 |
| routed_bit_index: | 1   0 |

This mapping allows a non-contiguous set of bits of node address to form row numbers.

Go through each physical_row number (0 . . . num_rows-1). Starting with the largest row routing address bit, swap the row routing address bit in physical_row with the routed_bit_index bit of physical_row. In other words: Swap(physical_row(routed _address_ bit), physical_row(routed_bit_index)). The sorting of the routed address bits becomes important when the ranges of the address bits and the routed_bit_index "overlap."

Repeat for each routed address bit.
Repeat for each physical_row number.

The above method gives the appearance of a firm mapping between the switches and the physical row number in the network. This is not really the case. Within any particular column of fabric cards, any order of fabric cards can be used without changing the nature of the invention. Note that it is the fabric cards that are permuted and not arbitrary switch rows. Within a particular fabric card there can be any permutation of switch rows.

Table 3 through Table 5 are representative examples which illustrate how the physical rows of the network are related to switch numbers and fabric cards and how the number of fabric cards is determined when particular row routing address bits are selected. These tables apply to a network in accordance with the invention where there are eight rows of switches, with four switch rows per fabric card, and two fabric cards in the network. Table 6 through Table 11 are further examples where there are sixteen rows with four switch rows per fabric card and four fabric cards in the network. Hexadecimal notation is used in the tables.

TABLE 3 row routing address bits: 2, 1
There are 8 rows with 4 switch rows per fabric card and 2 fabric cards

| physical row | Switch number | Fabric card number |
|---|---|---|
| 0 | 0 | 0 |
| 1 | 2 | 0 |
| 2 | 4 | 0 |
| 3 | 6 | 0 |
| 4 | 1 | 1 |
| 5 | 3 | 1 |
| 6 | 5 | 1 |
| 7 | 7 | 1 |

TABLE 4 row routing address bits: 2, 0
There are 8 rows with 4 switch rows per fabric card and 2 fabric cards

| physical row | Switch number | Fabric card number |
|---|---|---|
| 0 | 0 | 0 |
| 1 | 1 | 0 |
| 2 | 4 | 0 |
| 3 | 5 | 0 |
| 4 | 2 | 1 |
| 5 | 3 | 1 |
| 6 | 6 | 1 |
| 7 | 7 | 1 |

TABLE 5 row routing address bits: 1, 0
There are 8 rows with 4 switch rows per fabric card and 2 fabric cards

| physical row | Switch number | Fabric card number |
|---|---|---|
| 0 | 0 | 0 |
| 1 | 1 | 0 |
| 2 | 2 | 0 |
| 3 | 3 | 0 |
| 4 | 4 | 1 |
| 5 | 5 | 1 |
| 6 | 6 | 1 |
| 7 | 7 | 1 |

TABLE 6 row routing address bits: 3, 2
There are 16 rows with 4 switch rows per Fabric card and 4 Fabric cards

| physical row | Switch number | Fabric card number |
|---|---|---|
| 0 | 0 | 0 |
| 1 | 4 | 0 |
| 2 | 8 | 0 |
| 3 | C | 0 |
| 4 | 1 | 1 |
| 5 | 5 | 1 |
| 6 | 9 | 1 |
| 7 | D | 1 |
| 8 | 2 | 2 |
| 9 | 6 | 2 |
| A | A | 2 |
| B | E | 2 |
| C | 3 | 3 |
| D | 7 | 3 |
| E | B | 3 |
| F | F | 3 |

TABLE 7 row routing address bits: 3, 1
There are 16 rows with 4 switch rows per Fabric card and 4 Fabric cards

| physical row | Switch number | Fabric card number |
|---|---|---|
| 0 | 0 | 0 |
| 1 | 2 | 0 |
| 2 | 8 | 0 |
| 3 | A | 0 |
| 4 | 4 | 1 |
| 5 | 6 | 1 |
| 6 | C | 1 |
| 7 | E | 1 |
| 8 | 1 | 2 |
| 9 | 3 | 2 |
| A | 9 | 2 |

TABLE 7-continued row routing address bits: 3, 1
There are 16 rows with 4 switch rows per Fabric card and 4 Fabric cards

| physical row | Switch number | Fabric card number |
|---|---|---|
| B | B | 2 |
| C | 5 | 3 |
| D | 7 | 3 |
| E | D | 3 |
| F | F | 3 |

TABLE 8 row routing address bits: 3, 0
There are 16 rows with 4 switch rows per Fabric card and 4 Fabric cards

| physical row | Switch number | Fabric card number |
|---|---|---|
| 0 | 0 | 0 |
| 1 | 1 | 0 |
| 2 | 8 | 0 |
| 3 | 9 | 0 |
| 4 | 4 | 1 |
| 5 | 5 | 1 |
| 6 | C | 1 |
| 7 | D | 1 |
| 8 | 2 | 2 |
| 9 | 3 | 2 |
| A | A | 2 |
| B | B | 2 |
| C | 6 | 3 |
| D | 7 | 3 |
| E | E | 3 |
| F | F | 3 |

TABLE 9 row routing address bits: 2, 1
There are 16 rows with 4 switch rows per Fabric card and 4 Fabric cards

| physical row | Switch number | Fabric card number |
|---|---|---|
| 0 | 0 | 0 |
| 1 | 2 | 0 |
| 2 | 4 | 0 |
| 3 | 6 | 0 |
| 4 | 1 | 1 |
| 5 | 3 | 1 |
| 6 | 5 | 1 |
| 7 | 7 | 1 |
| 8 | 8 | 2 |
| 9 | A | 2 |
| A | C | 2 |
| B | E | 2 |
| C | 9 | 3 |
| D | B | 3 |
| E | D | 3 |
| F | F | 3 |

TABLE 10 row routing address bits: 2, 0
There are 16 rows with 4 switch rows per Fabric card and 4 Fabric cards

| physical row | Switch number | Fabric card number |
|---|---|---|
| 0 | 0 | 0 |
| 1 | 1 | 0 |
| 2 | 4 | 0 |
| 3 | 5 | 0 |
| 4 | 2 | 1 |
| 5 | 3 | 1 |
| 6 | 6 | 1 |
| 7 | 7 | 1 |
| 8 | 8 | 2 |
| 9 | 9 | 2 |
| A | C | 2 |
| B | D | 2 |
| C | A | 3 |
| D | B | 3 |
| E | E | 3 |
| F | F | 3 |

TABLE 11 row routing address bits: 1, 0
There are 16 rows with 4 switch rows per Fabric card and 4 Fabric cards

| physical row | Switch number | Fabric card number |
|---|---|---|
| 0 | 0 | 0 |
| 1 | 1 | 0 |
| 2 | 2 | 0 |
| 3 | 3 | 0 |
| 4 | 4 | 1 |
| 5 | 5 | 1 |
| 6 | 6 | 1 |
| 7 | 7 | 1 |
| 8 | 8 | 2 |
| 9 | 9 | 2 |
| A | A | 2 |
| B | B | 2 |
| C | C | 3 |
| D | D | 3 |
| E | E | 3 |
| F | F | 3 |

Figure 4:
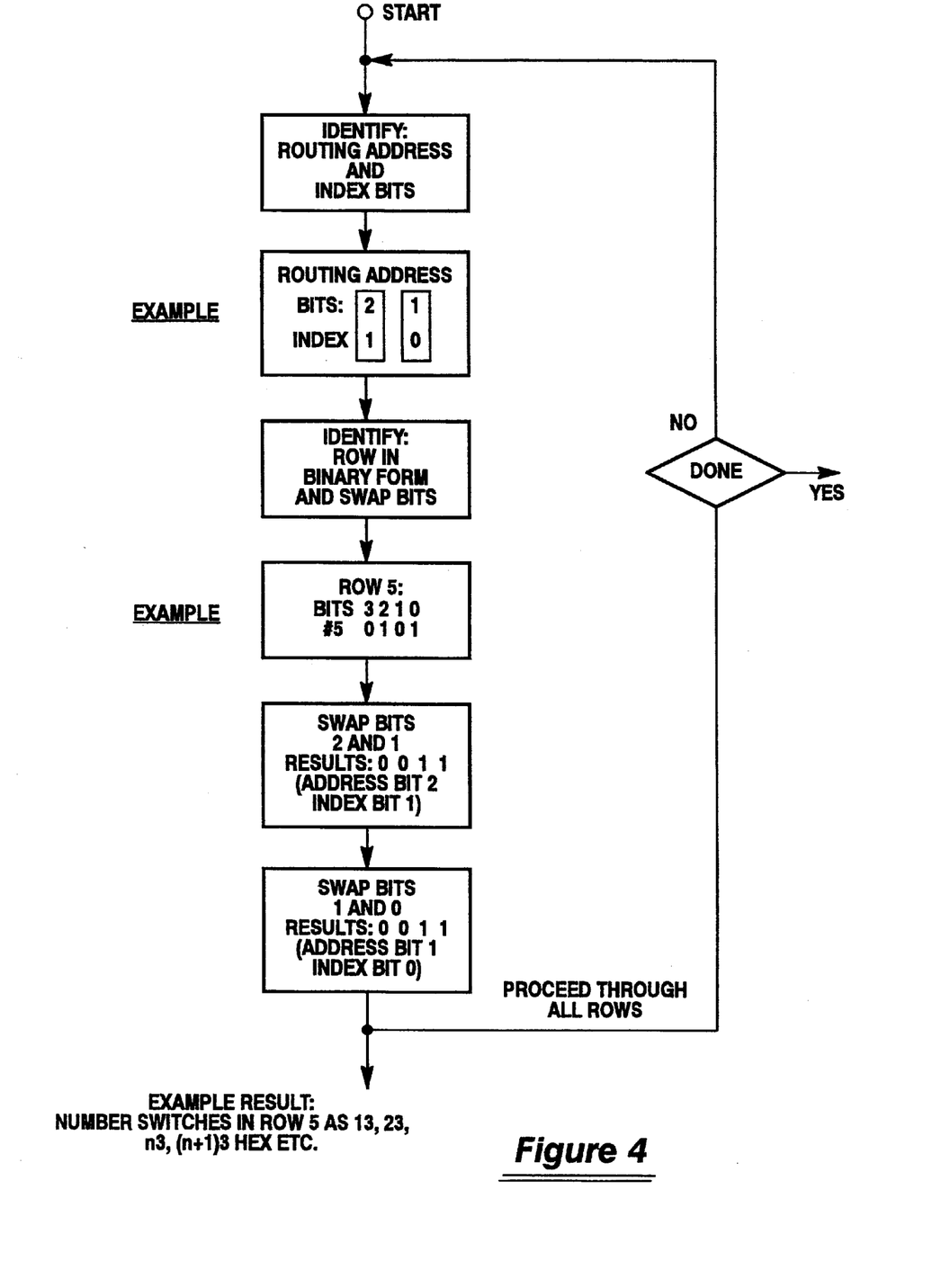
FIGS. 4, 5 and 6 are flow diagrams that illustrate the bit swapping method of the invention.
Figure 5:
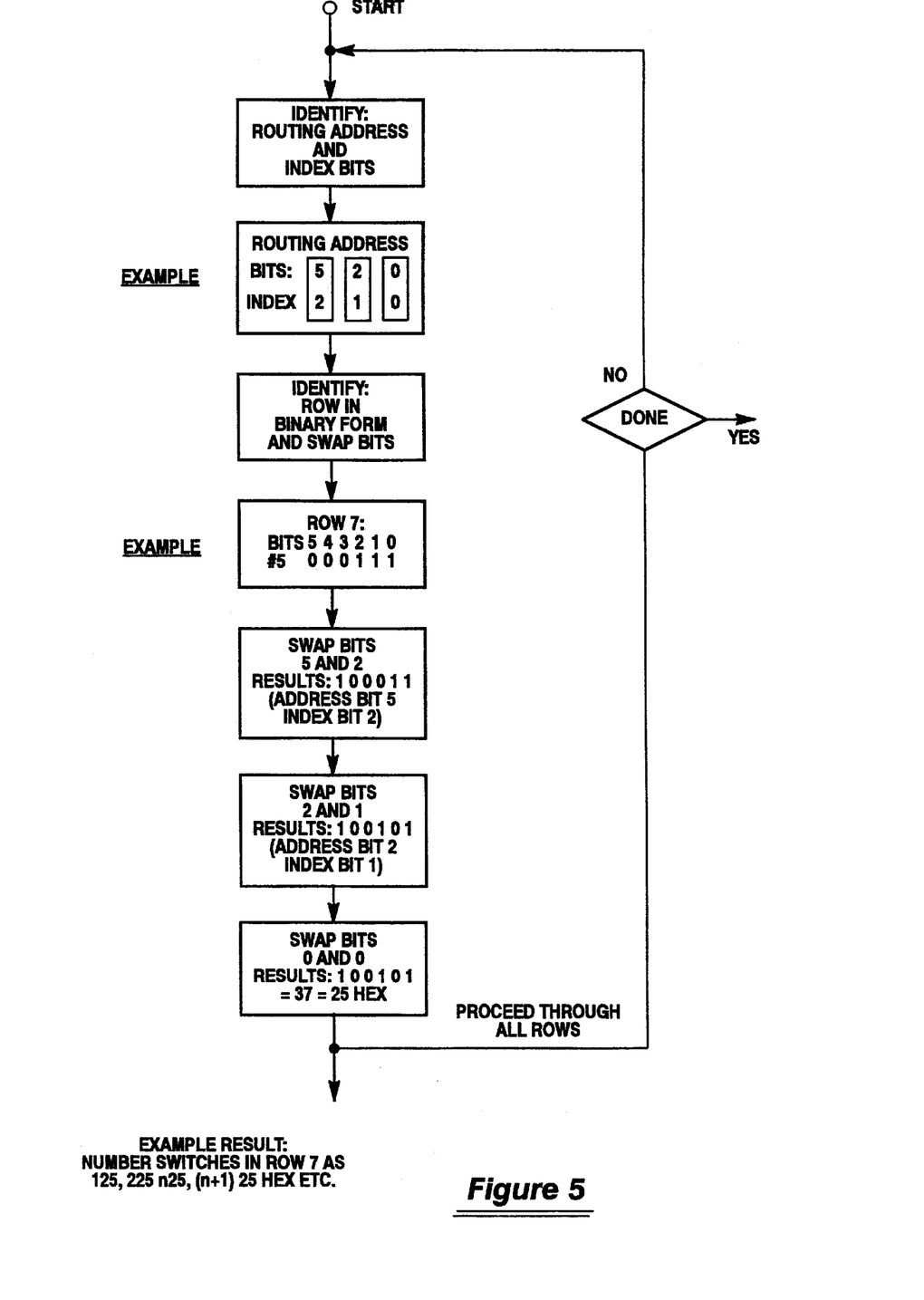
Figure 6:
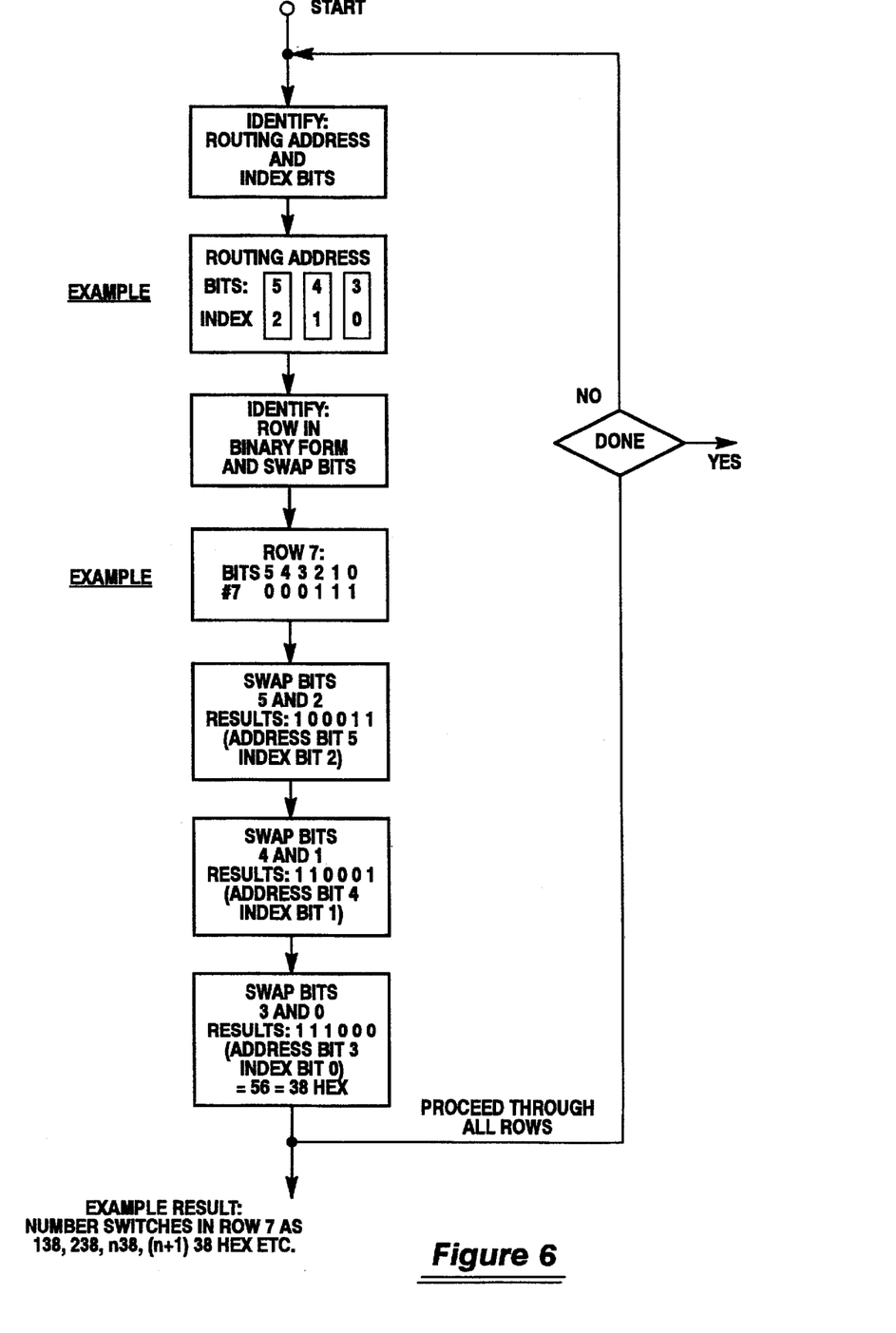

Examples of the method for determining the numbering of the switches on the fabric cards of a network are shown in FIGS. 4, 5 and 6. FIG. 4 uses the wiring topology of the network of FIG. 2 using address bits 2 and 1 as the routing address bits. Row routing address bit 1 is also identified as index bit 0 and row routing address bit 2 as index bit 1. Now selecting a physical row, for example, physical row 5, which is represented by the binary number 0101, the first step is to swap bits 2 (routing address bit) and 1 (index bit) of the binary representation of number 5. This results in binary number 0011. The next step is to swap bits 1 (routing address bit) and 0 (index bit) which results in the binary number 0011. Since the bits 1 and 0 have the same value in this case, the final binary number that is obtained is 0011 or 3. Thus, switches in physical row 5 will be designated with a 3 number in fabric card 1. Switches 13 and 23 appear in stages 1 and 2, respectively, of physical row 5. These switches are, therefore, found on fabric card 220. Following a similar procedure for all of the unpermuted physical rows of FIG. 2, the appropriate switch numbers for the switches in stages 1 and 2 of the fabric cards will be obtained. The results for all of the rows are in Table 3.

FIG. 5 is another illustration of how the row routing address bits and index bits are swapped with the process of the invention to obtain the proper numbering of the switches on the fabric cards. The proper numbering of switches on fabric cards for this example (which is not illustrated on a fabric card drawing) further shows the operation of the method. Row routing address bits may be selected in any manner, for example, row address bits 5, 2 and 0 may be utilized for row address routing. In this instance, row address bit 5 is associated with index bit 2, row address bit 2 is associated with index bit 1 and row address bit 0 is associated with index bit 0. In this example, bits_routed_per_fabric_card is three and num_rows is 64 giving six bits in the entire row address. Physical row 7, for example, is represented by the binary designation of 000111. Proceeding to the first step of the method, FIG. 5 shows that bits 5 (routing address bit) and 2 (index bit) are swapped to provide the binary designation 100011. The next bits that are swapped are bits 2 (routing address bit) and 1 (index bit), which changes the binary designation to 100101. Then the method causes both 0 (routing address bit) and 0 (index bit) to be "swapped," but since these are the same the resulting switch number in decimal form is 37 or in hexadecimal form is 0×25. Thus, a switch which is in physical row 7 for this example would be numbered in accordance with the stage in which it appears. For example, in stage 1 the switch would be (using hexadecimal notation for the switch number portion) 125, in stage 2 it would be 225, in stage n it would be n25, in stage m+1 it would be (m+1)25, etc.

A third example is also not shown in a fabric card drawing but is represented in the flow diagram of FIG. 6 and is described below. In this example the row routing address bits are 5, 4 and 3. For this example we will pick physical row 7, which is, represented as binary 000111. The first bits that are swapped by the method are bits 5 (routing address bit) and 2 (index bit) which turns the binary number 000111 into 100011. Following this, bits 4 (routing address bit) and 1 (index bit) are swapped and the number now becomes 110001. Finally, the bits 3 (routing address bit) and 0 (index bit) are swapped and the final designation becomes 111000 so the switch number is 56 or hexadecimal 0×38. The switches in physical row 7 for this example are thus numbered (using hexadecimal notation) 138, 238 . . . n38, (n+1)38, etc.

In the example of FIG. 5 where there is a row routing address bit 2 and an index bit 2, there is said to be an "overlap" in the ranges of the address and index bits. This means that the order in which the swapping of bits occurs is of significance. In the final example of FIG. 6, none of the address bits or index bits have the same value so there is no overlap, and, therefore, the order of swapping of bits in this example is not material. FIG. 4 also has overlap in bit 1.

Due to the complexity of the 32-port switch, a representative drawing is not provided. However, the wiring pattern of the fabric cards based on the cards of FIG. 2 can be established as set forth in Table 14 for the routing bits set forth in Table 1. Hexadecimal numbering is used in the table. (Table 12 and Table 13 show wiring patterns for 8-port and 16-port networks respectively. The 8-port network corresponds to FIG. 1 and the 16-port network corresponds to FIG. 2.) Note that Row in the table is not necessarily the physical row, but is the number associated with the switch. This 32-port embodiment will contain eight fabric cards on which stages 1, 2, 3 and 4 are incorporated. In this embodiment there are four fabric cards for stages 1 and 2 and four more fabric cards for stages 3 and 4 of the switches. The eight fabric cards are all of the same identical construction as those of the embodiment of FIG. 2.

In accordance with the method, the switches on the fabric cards will have different switch numbers than they did with the smaller 16-port network. In this embodiment the switches in stage 0 are back-panel wired to the switches in stage 1 using the row routing address bits 0 and 3. The row routing address bits 3 and 2 route data from stage 1 through wiring on the fabric cards to stage 2. The row routing address bits 2 and 1 route the back-panel wiring from stage 2 switches to stage 3 switches, and the row routing address bits 1 and 0 route the stage 3 to stage 4 switches on the fabric cards of the last two columns of switches. Outputs of the fourth stage switches can be wired directly to an output column of drivers or the switches can drive the outputs directly. The use of output drivers in networks like this embodiment where an odd number of stages is implemented is desirable to maintain a constant drive output level and to optionally always have two switches per row on an edge card.

The assignment of switch numbers to fabric cards for this embodiment are shown in Table 6 through Table 11 giving all possible pairings of 2 row routing address bits when there are 4 bits total. The row routing address bits for the particular switch determines which table to use. The order of the row routing address bits does not matter when choosing which table to use. For example, row routing address bits 2, 1 and 1, 2 would both use the table for 2, 1.

TABLE 12

4-Row, 8-Port Network

| Outputs | | | Inputs | | |
|---|---|---|---|---|---|
| Column (Stage) | Row | Switch terminal | Column (Stage) | Row | Switch terminal |
| 0 | 0 | 0 | 1 | 0 | 0 |
| 0 | 0 | 1 | 1 | 2 | 1 |
| 0 | 0 | 2 | 1 | 1 | 2 |
| 0 | 1 | 0 | 1 | 1 | 0 |
| 0 | 1 | 1 | 1 | 3 | 1 |
| 0 | 1 | 2 | 1 | 0 | 2 |
| 0 | 2 | 0 | 1 | 2 | 0 |
| 0 | 2 | 1 | 1 | 0 | 1 |
| 0 | 2 | 2 | 1 | 3 | 2 |
| 0 | 3 | 0 | 1 | 3 | 0 |
| 0 | 3 | 1 | 1 | 1 | 1 |
| 0 | 3 | 2 | 1 | 2 | 2 |
| 1 | 0 | 0 | 2 | 0 | 0 |
| 1 | 0 | 1 | 2 | 1 | 1 |
| 1 | 0 | 2 | 2 | 2 | 2 |
| 1 | 1 | 0 | 2 | 1 | 0 |
| 1 | 1 | 1 | 2 | 0 | 1 |
| 1 | 1 | 2 | 2 | 3 | 2 |
| 1 | 2 | 0 | 2 | 2 | 0 |
| 1 | 2 | 1 | 2 | 3 | 1 |
| 1 | 2 | 2 | 2 | 0 | 2 |
| 1 | 3 | 0 | 2 | 3 | 0 |
| 1 | 3 | 1 | 2 | 2 | 1 |
| 1 | 3 | 2 | 2 | 1 | 2 |

TABLE 13

8-Row, 16-Port Network

| Outputs | | | Inputs | | |
|---|---|---|---|---|---|
| Column (Stage) | Row | Switch terminal | Column (Stage) | Row | Switch terminal |
| 0 | 0 | 0 | 1 | 0 | 0 |
| 0 | 0 | 1 | 1 | 4 | 1 |
| 0 | 0 | 2 | 1 | 1 | 2 |
| 0 | 1 | 0 | 1 | 1 | 0 |
| 0 | 1 | 1 | 1 | 5 | 1 |
| 0 | 1 | 2 | 1 | 0 | 2 |
| 0 | 2 | 0 | 1 | 2 | 0 |
| 0 | 2 | 1 | 1 | 6 | 1 |
| 0 | 2 | 2 | 1 | 3 | 2 |
| 0 | 3 | 0 | 1 | 3 | 0 |
| 0 | 3 | 1 | 1 | 7 | 1 |
| 0 | 3 | 2 | 1 | 2 | 2 |
| 0 | 4 | 0 | 1 | 4 | 0 |
| 0 | 4 | 1 | 1 | 0 | 1 |
| 0 | 4 | 2 | 1 | 5 | 2 |
| 0 | 5 | 0 | 1 | 5 | 0 |
| 0 | 5 | 1 | 1 | 1 | 1 |
| 0 | 5 | 2 | 1 | 4 | 2 |
| 0 | 6 | 0 | 1 | 6 | 0 |
| 0 | 6 | 1 | 1 | 2 | 1 |

TABLE 13-continued

8-Row, 16-Port Network

| Outputs | | | Inputs | | |
|---|---|---|---|---|---|
| Column (Stage) | Row | Switch terminal | Column (Stage) | Row | Switch terminal |
| 0 | 6 | 2 | 1 | 7 | 2 |
| 0 | 7 | 0 | 1 | 7 | 0 |
| 0 | 7 | 1 | 1 | 3 | 1 |
| 0 | 7 | 2 | 1 | 6 | 2 |
| 1 | 0 | 0 | 2 | 0 | 0 |
| 1 | 0 | 1 | 2 | 2 | 1 |
| 1 | 0 | 2 | 2 | 4 | 2 |
| 1 | 1 | 0 | 2 | 1 | 0 |
| 1 | 1 | 1 | 2 | 3 | 1 |
| 1 | 1 | 2 | 2 | 5 | 2 |
| 1 | 2 | 0 | 2 | 2 | 0 |
| 1 | 2 | 1 | 2 | 0 | 1 |
| 1 | 2 | 2 | 2 | 6 | 2 |
| 1 | 3 | 0 | 2 | 3 | 0 |
| 1 | 3 | 1 | 2 | 1 | 1 |
| 1 | 3 | 2 | 2 | 7 | 2 |
| 1 | 4 | 0 | 2 | 4 | 0 |
| 1 | 4 | 1 | 2 | 6 | 1 |
| 1 | 4 | 2 | 2 | 0 | 2 |
| 1 | 5 | 0 | 2 | 5 | 0 |
| 1 | 5 | 1 | 2 | 7 | 1 |
| 1 | 5 | 2 | 2 | 1 | 2 |
| 1 | 6 | 0 | 2 | 6 | 0 |
| 1 | 6 | 1 | 2 | 4 | 1 |
| 1 | 6 | 2 | 2 | 2 | 2 |
| 1 | 7 | 0 | 2 | 7 | 0 |
| 1 | 7 | 1 | 2 | 5 | 1 |
| 1 | 7 | 2 | 2 | 3 | 2 |
| 2 | 0 | 0 | 3 | 0 | 0 |
| 2 | 0 | 1 | 3 | 1 | 1 |
| 2 | 0 | 2 | 3 | 2 | 2 |
| 2 | 1 | 0 | 3 | 1 | 0 |
| 2 | 1 | 1 | 3 | 0 | 1 |
| 2 | 1 | 2 | 3 | 3 | 2 |
| 2 | 2 | 0 | 3 | 2 | 0 |
| 2 | 2 | 1 | 3 | 3 | 1 |
| 2 | 2 | 2 | 3 | 0 | 2 |
| 2 | 3 | 0 | 3 | 3 | 0 |
| 2 | 3 | 1 | 3 | 2 | 1 |
| 2 | 3 | 2 | 3 | 1 | 2 |
| 2 | 4 | 0 | 3 | 4 | 0 |
| 2 | 4 | 1 | 3 | 5 | 1 |
| 2 | 4 | 2 | 3 | 6 | 2 |
| 2 | 5 | 0 | 3 | 5 | 0 |
| 2 | 5 | 1 | 3 | 4 | 1 |
| 2 | 5 | 2 | 3 | 7 | 2 |
| 2 | 6 | 0 | 3 | 6 | 0 |
| 2 | 6 | 1 | 3 | 7 | 1 |
| 2 | 6 | 2 | 3 | 4 | 2 |
| 2 | 7 | 0 | 3 | 7 | 0 |
| 2 | 7 | 1 | 3 | 6 | 1 |
| 2 | 7 | 2 | 3 | 5 | 2 |

TABLE 14

16-Row, 32-Port Network

| Outputs | | | Inputs | | |
|---|---|---|---|---|---|
| Column (Stage) | Row | Switch terminal | Column (Stage) | Row | Switch terminal |
| 0 | 0 | 0 | 1 | 0 | 0 |
| 0 | 0 | 1 | 1 | 8 | 1 |
| 0 | 0 | 2 | 1 | 1 | 2 |
| 0 | 1 | 0 | 1 | 1 | 0 |
| 0 | 1 | 1 | 1 | 9 | 1 |
| 0 | 1 | 2 | 1 | 0 | 2 |
| 0 | 2 | 0 | 1 | 2 | 0 |

TABLE 14-continued

16-Row, 32-Port Network

| Outputs | | | Inputs | | |
|---|---|---|---|---|---|
| Column (Stage) | Row | Switch terminal | Column (Stage) | Row | Switch terminal |
| 0 | 2 | 1 | 1 | A | 1 |
| 0 | 2 | 2 | 1 | 3 | 2 |
| 0 | 3 | 0 | 1 | 3 | 0 |
| 0 | 3 | 1 | 1 | B | 1 |
| 0 | 3 | 2 | 1 | 2 | 2 |
| 0 | 4 | 0 | 1 | 4 | 0 |
| 0 | 4 | 1 | 1 | C | 1 |
| 0 | 4 | 2 | 1 | 5 | 2 |
| 0 | 5 | 0 | 1 | 5 | 0 |
| 0 | 5 | 1 | 1 | D | 1 |
| 0 | 5 | 2 | 1 | 4 | 2 |
| 0 | 6 | 0 | 1 | 6 | 0 |
| 0 | 6 | 1 | 1 | E | 1 |
| 0 | 6 | 2 | 1 | 7 | 2 |
| 0 | 7 | 0 | 1 | 7 | 0 |
| 0 | 7 | 1 | 1 | F | 1 |
| 0 | 7 | 2 | 1 | 6 | 2 |
| 0 | 8 | 0 | 1 | 8 | 0 |
| 0 | 8 | 1 | 1 | 0 | 1 |
| 0 | 8 | 2 | 1 | 9 | 2 |
| 0 | 9 | 0 | 1 | 9 | 0 |
| 0 | 9 | 1 | 1 | 1 | 1 |
| 0 | 9 | 2 | 1 | 8 | 2 |
| 0 | A | 0 | 1 | A | 0 |
| 0 | A | 1 | 1 | 2 | 1 |
| 0 | A | 2 | 1 | B | 2 |
| 0 | B | 0 | 1 | B | 0 |
| 0 | B | 1 | 1 | 3 | 1 |
| 0 | B | 2 | 1 | A | 2 |
| 0 | C | 0 | 1 | C | 0 |
| 0 | C | 1 | 1 | 4 | 1 |
| 0 | C | 2 | 1 | D | 2 |
| 0 | D | 0 | 1 | D | 0 |
| 0 | D | 1 | 1 | 5 | 1 |
| 0 | D | 2 | 1 | C | 2 |
| 0 | E | 0 | 1 | E | 0 |
| 0 | E | 1 | 1 | 6 | 1 |
| 0 | E | 2 | 1 | F | 2 |
| 0 | F | 0 | 1 | F | 0 |
| 0 | F | 1 | 1 | 7 | 1 |
| 0 | F | 2 | 1 | E | 2 |
| 1 | 0 | 0 | 2 | 0 | 0 |
| 1 | 0 | 1 | 2 | 4 | 1 |
| 1 | 0 | 2 | 2 | 8 | 2 |
| 1 | 1 | 0 | 2 | 1 | 0 |
| 1 | 1 | 1 | 2 | 5 | 1 |
| 1 | 1 | 2 | 2 | 9 | 2 |
| 1 | 2 | 0 | 2 | 2 | 0 |
| 1 | 2 | 1 | 2 | 6 | 1 |
| 1 | 2 | 2 | 2 | A | 2 |
| 1 | 3 | 0 | 2 | 3 | 0 |
| 1 | 3 | 1 | 2 | 7 | 1 |
| 1 | 3 | 2 | 2 | B | 2 |
| 1 | 4 | 0 | 2 | 4 | 0 |
| 1 | 4 | 1 | 2 | 0 | 1 |
| 1 | 4 | 2 | 2 | C | 2 |
| 1 | 5 | 0 | 2 | 5 | 0 |
| 1 | 5 | 1 | 2 | 1 | 1 |
| 1 | 5 | 2 | 2 | D | 2 |
| 1 | 6 | 0 | 2 | 6 | 0 |
| 1 | 6 | 1 | 2 | 2 | 1 |
| 1 | 6 | 2 | 2 | E | 2 |
| 1 | 7 | 0 | 2 | 7 | 0 |
| 1 | 7 | 1 | 2 | 3 | 1 |
| 1 | 7 | 2 | 2 | F | 2 |
| 1 | 8 | 0 | 2 | 8 | 0 |
| 1 | 8 | 1 | 2 | C | 1 |
| 1 | 8 | 2 | 2 | 0 | 2 |
| 1 | 9 | 0 | 2 | 9 | 0 |
| 1 | 9 | 1 | 2 | D | 1 |
| 1 | 9 | 2 | 2 | 1 | 2 |
| 1 | A | 0 | 2 | A | 0 |

TABLE 14-continued

16-Row, 32-Port Network

| Outputs | | | Inputs | | |
|---|---|---|---|---|---|
| Column (Stage) | Row | Switch terminal | Column (Stage) | Row | Switch terminal |
| 1 | A | 1 | 2 | E | 1 |
| 1 | A | 2 | 2 | 2 | 2 |
| 1 | B | 0 | 2 | B | 0 |
| 1 | B | 1 | 2 | F | 1 |
| 1 | B | 2 | 2 | 3 | 2 |
| 1 | C | 0 | 2 | C | 0 |
| 1 | C | 1 | 2 | 8 | 1 |
| 1 | C | 2 | 2 | 4 | 2 |
| 1 | D | 0 | 2 | D | 0 |
| 1 | D | 1 | 2 | 9 | 1 |
| 1 | D | 2 | 2 | 5 | 2 |
| 1 | E | 0 | 2 | E | 0 |
| 1 | E | 1 | 2 | A | 1 |
| 1 | E | 2 | 2 | 6 | 2 |
| 1 | F | 0 | 2 | F | 0 |
| 1 | F | 1 | 2 | B | 1 |
| 1 | F | 2 | 2 | 7 | 2 |
| 2 | 0 | 0 | 3 | 0 | 0 |
| 2 | 0 | 1 | 3 | 2 | 1 |
| 2 | 0 | 2 | 3 | 4 | 2 |
| 2 | 1 | 0 | 3 | 1 | 0 |
| 2 | 1 | 1 | 3 | 3 | 1 |
| 2 | 1 | 2 | 3 | 5 | 2 |
| 2 | 2 | 0 | 3 | 2 | 0 |
| 2 | 2 | 1 | 3 | 0 | 1 |
| 2 | 2 | 2 | 3 | 6 | 2 |
| 2 | 3 | 0 | 3 | 3 | 0 |
| 2 | 3 | 1 | 3 | 1 | 1 |
| 2 | 3 | 2 | 3 | 7 | 2 |
| 2 | 4 | 0 | 3 | 4 | 0 |
| 2 | 4 | 1 | 3 | 6 | 1 |
| 2 | 4 | 2 | 3 | 0 | 2 |
| 2 | 5 | 0 | 3 | 5 | 0 |
| 2 | 5 | 1 | 3 | 7 | 1 |
| 2 | 5 | 2 | 3 | 1 | 2 |
| 2 | 6 | 0 | 3 | 6 | 0 |
| 2 | 6 | 1 | 3 | 4 | 1 |
| 2 | 6 | 2 | 3 | 2 | 2 |
| 2 | 7 | 0 | 3 | 7 | 0 |
| 2 | 7 | 1 | 3 | 5 | 1 |
| 2 | 7 | 2 | 3 | 3 | 2 |
| 2 | 8 | 0 | 3 | 8 | 0 |
| 2 | 8 | 1 | 3 | A | 1 |
| 2 | 8 | 2 | 3 | C | 2 |
| 2 | 9 | 0 | 3 | 9 | 0 |
| 2 | 9 | 1 | 3 | B | 1 |
| 2 | 9 | 2 | 3 | D | 2 |
| 2 | A | 0 | 3 | A | 0 |
| 2 | A | 1 | 3 | 8 | 1 |
| 2 | A | 2 | 3 | E | 2 |
| 2 | B | 0 | 3 | B | 0 |
| 2 | B | 1 | 3 | 9 | 1 |
| 2 | B | 2 | 3 | F | 2 |
| 2 | C | 0 | 3 | C | 0 |
| 2 | C | 1 | 3 | E | 1 |
| 2 | C | 2 | 3 | 8 | 2 |
| 2 | D | 0 | 3 | D | 0 |
| 2 | D | 1 | 3 | F | 1 |
| 2 | D | 2 | 3 | 9 | 2 |
| 2 | E | 0 | 3 | E | 0 |
| 2 | E | 1 | 3 | C | 1 |
| 2 | E | 2 | 3 | A | 2 |
| 2 | F | 0 | 3 | F | 0 |
| 2 | F | 1 | 3 | D | 1 |
| 2 | F | 2 | 3 | B | 2 |
| 3 | 0 | 0 | 4 | 0 | 0 |
| 3 | 0 | 1 | 4 | 1 | 1 |
| 3 | 0 | 2 | 4 | 2 | 2 |
| 3 | 1 | 0 | 4 | 1 | 0 |
| 3 | 1 | 1 | 4 | 0 | 1 |
| 3 | 1 | 2 | 4 | 3 | 2 |
| 3 | 2 | 0 | 4 | 2 | 0 |
| 3 | 2 | 1 | 4 | 3 | 1 |
| 3 | 2 | 2 | 4 | 0 | 2 |
| 3 | 3 | 0 | 4 | 3 | 0 |
| 3 | 3 | 1 | 4 | 2 | 1 |
| 3 | 3 | 2 | 4 | 1 | 2 |
| 3 | 4 | 0 | 4 | 4 | 0 |
| 3 | 4 | 1 | 4 | 5 | 1 |
| 3 | 4 | 2 | 4 | 6 | 2 |
| 3 | 5 | 0 | 4 | 5 | 0 |
| 3 | 5 | 1 | 4 | 4 | 1 |
| 3 | 5 | 2 | 4 | 7 | 2 |
| 3 | 6 | 0 | 4 | 6 | 0 |
| 3 | 6 | 1 | 4 | 7 | 1 |
| 3 | 6 | 2 | 4 | 4 | 2 |
| 3 | 7 | 0 | 4 | 7 | 0 |
| 3 | 7 | 1 | 4 | 6 | 1 |
| 3 | 7 | 2 | 4 | 5 | 2 |
| 3 | 8 | 0 | 4 | 8 | 0 |
| 3 | 8 | 1 | 4 | 9 | 1 |
| 3 | 8 | 2 | 4 | A | 2 |
| 3 | 9 | 0 | 4 | 9 | 0 |
| 3 | 9 | 1 | 4 | 8 | 1 |
| 3 | 9 | 2 | 4 | B | 2 |
| 3 | A | 0 | 4 | A | 0 |
| 3 | A | 1 | 4 | B | 1 |
| 3 | A | 2 | 4 | 8 | 2 |
| 3 | B | 0 | 4 | B | 0 |
| 3 | B | 1 | 4 | A | 1 |
| 3 | B | 2 | 4 | 9 | 2 |
| 3 | C | 0 | 4 | C | 0 |
| 3 | C | 1 | 4 | D | 1 |
| 3 | C | 2 | 4 | E | 2 |
| 3 | D | 0 | 4 | D | 0 |
| 3 | D | 1 | 4 | C | 1 |
| 3 | D | 2 | 4 | F | 2 |
| 3 | E | 0 | 4 | E | 0 |
| 3 | E | 1 | 4 | F | 1 |
| 3 | E | 2 | 4 | C | 2 |
| 3 | F | 0 | 4 | F | 0 |
| 3 | F | 1 | 4 | E | 1 |
| 3 | F | 2 | 4 | D | 2 |

What is claimed is:

1. A method for interconnecting switches in a network each of which interconnection switches have an equal number of input terminals of at least two input terminals and an equal number of output terminals of at least two output terminals, and are arranged into an even number of rows and an even number of columns of at least four rows and at least 2 columns on one or more cards, wherein the network is of the type which employs a selected plurality of row address bits to determine the routing of connection paths between adjacent columns of interconnection switches so that routing is made from the output terminals of the switches in a first column of switches to the input terminals of the interconnection switches in a second column of interconnection switches located immediately adjacent said first column of interconnection switches in accordance with unique identification numbers assigned to each of said interconnection switches comprising the steps of:

(a) choosing the number of rows in the network;
(b) choosing the number of columns per card;
(c) choosing the number of row address bits that are to be routed;
(d) calculating the minimum number of rows per card equal to $2^n$, where n=number of different row address bits routed per card;

(e) determining if the minimum number of rows per card is to be employed or if instead an integer multiple of the minimum number of rows per card is to be used;

(f) choosing which row address bits will be used to route circuit paths from the output terminals of each column of interconnection switches, except the output column, to the input terminals of each column of interconnection switches, except the input column;

(g) sorting row address bits that are selected for use from the highest to the lowest number and associating sequentially numbered index bits with said row address bits such that each index bit is linked to the one of said row address bits that has the same relative position number with respect to the row address bit numbers as the associated index bit has with respect to the index bit numbers;

(h) swapping the row address bit in the largest numbered physical row with the routed bit index bit associated with that physical row;

(i) repeating step (h) for each of the row address bits; and (j) repeating steps (h) and (i) for each physical row number of the network.

2. A method as claimed in claim 1, including the additional steps of:

(k) determining the number of additional columns of switches to be added to the network by calculating from the equation the number of additional columns=1+log$_2$ (number of rows) minus (number log$_2$ of columns of switches on cards) and;

(l) determining whether an input column of switches or an output column of switches is to be employed when the additional column number is 1, and that both an input column of switches and an output column of switches is to be employed when the additional column number is 2.

3. A method as claimed in claim 2, including the additional step of permuting physical rows to simplify interconnection wiring between said additional column or columns of switches and said interconnection switches.

4. A recursive multi-stage switching network comprising, (1) one or more fabric cards, each of which comprises interconnection switches, which have an equal number of input terminals of at least two input terminals and an equal number of output terminals of at least two output terminals and are arranged into an even number of rows of at least four and an even number of columns of at least two, wherein the network is of the type which employs a selected plurality of row address bits to determine the routing of connection paths between adjacent columns of interconnection switches so that routing is made from the output terminals of the interconnection switches in a first column of switches to the input terminals of interconnection switches in accordance with unique identification numbers assigned to each of said interconnection switches in which the interconnection path of each of said fabric cards in a network is identically wired regardless of the number of fabric cards employed in the network in accordance with the steps of:

(a) choosing the number of rows in the network;

(b) choosing the number of columns per card;

(c) choosing the number of row address bits that are to be routed;

(d) calculating the minimum number of rows per card equal to $2^n$, where n=number of bits routed per card;

(e) determining if the minimum number of rows per card is to be employed, or if instead an integer multiple of the minimum number of rows per card is to be used;

(f) choosing which row address bits will be used to route circuit paths from the output terminals of each column of interconnection switches, except the output column, to the input terminals of each column of interconnection switches, except the input column;

(g) sorting row address bits that are selected for use from the highest to the lowest number and associating sequentially numbered index bits with said row address bits such that each index bit is linked to the one of said row address bits that has the same relative position number with respect to the row address bit numbers as the associated index bit has with respect to the index bit numbers;

(h) swapping the row address bit in the largest number physical row with the routed bit index bit associated with that physical row;

(i) repeating step (h) for each of the row address bits; and (j) repeating steps (h) and (i) for each physical row number of the network, (2) a column of additional input switches each having at least two input terminals and arranged into a number of rows equal to the number of rows of said interconnection switches and each associated with one of said rows of said interconnection switches, and (3) connection paths between said input switches and said fabric cards is made by using either the physical row numbers, or a permutation of said physical row numbers, of said input switches in accordance with step 5 of element (1) of this claim.

5. A recursive multi-stage switching network as claimed in claim 4 further comprising a column of output switches each having at least two output terminals and arranged into a number of rows of said interconnection switches and each associated with one of said rows of said interconnection systems.

6. A recursive multi-stage switching network as claimed in claim 5 comprising a recirculation path from an output terminal of each interconnection switch that is in an output column of interconnection switches that do not have output terminals connected to the input terminals of other interconnection switches connected to an input terminal of the one of said output switches that is in the same row as the connected switch, wherein said output switch has an output terminal coupled to an input terminal of an interconnection switch in an input column of interconnection switches that do not have input terminals connected to the output terminals of other interconnection switches and which is in the same row as the coupled output switch.

7. A recursive multi-stage switching network as claimed in claim 4 further comprising a column of output drivers each having at least two output terminals and arranged into a number of rows of said interconnection switches and each associated with one of said rows of said interconnection systems.

8. A recursive multi-stage switching network as claimed in claim 7 comprising a recirculation path from an output terminal of each interconnection switch that is in an output column of interconnection switches that do not have output terminals connected to the input terminals of other interconnection switches coupled to an input terminal of the one of said output drivers that is in the same row as the coupled interconnection switch, wherein said output driver has an output terminal coupled to an input terminal of an interconnection switch in an input column of interconnection switches that do not have input terminals connected to the output terminals of other interconnection switches and which is in the same row as the coupled output driver.

9. A recursive multi-stage switching network as claimed in claim 4 further comprising a column of input drivers each having at least two output terminals and arranged into a number of rows of said interconnection switches and each associated with one of said rows of said interconnection systems.

10. A recursive multi-stage switching network as claimed in claim 9 comprising a recirculation path from an output terminal of each interconnection switch that is in an output column of interconnection switches that do not have output terminals connected to the input terminals of other interconnection switches coupled to an input terminal of the one of said input drivers that is in the same row as the coupled interconnection switch, wherein said input driver has an output terminal coupled to an input terminal of an interconnection switch in an input column of interconnection switches that do not have input terminals connected to the output terminals of other interconnection switches and which is in the same row as the coupled input driver.

* * * * *